(12) United States Patent
Laframboise et al.

(10) Patent No.: US 8,727,449 B2
(45) Date of Patent: May 20, 2014

(54) VEHICULAR TRIM APPLICATIONS USING FILM ADHESIVE IN LIEU OF STITCHING

(75) Inventors: Gregg Laframboise, Windsor (CA); David Thimm, Plymouth, MI (US); Richard P. Doerer, Royal Oak, MI (US); Daniel J. Koester, Ann Arbor, MI (US); Marie R. Howell, South Lyon, MI (US); Sandra L. Smith, Waterford, MI (US); Jeffrey Suiter, Taylor, MI (US); Teresa A. Stapleton, Canton, MI (US); Duane Potes, Jr., Adrian, MI (US)

(73) Assignee: Johnson Controls Technology Company, Holland, MI (US)

( * ) Notice: Subject to any disclaimer, the term of this patent is extended or adjusted under 35 U.S.C. 154(b) by 706 days.

(21) Appl. No.: 12/934,417

(22) PCT Filed: Mar. 25, 2009

(86) PCT No.: PCT/US2009/038176
§ 371 (c)(1),
(2), (4) Date: Sep. 24, 2010

(87) PCT Pub. No.: WO2009/120738
PCT Pub. Date: Oct. 1, 2009

(65) Prior Publication Data
US 2011/0260508 A1   Oct. 27, 2011

Related U.S. Application Data

(60) Provisional application No. 61/039,229, filed on Mar. 25, 2008.

(51) Int. Cl.
*B60R 22/00*   (2006.01)

(52) U.S. Cl.
USPC .................................. 297/482; 297/463.2

(58) Field of Classification Search
USPC ............. 297/482, 452.62, 219.12, 463.2
See application file for complete search history.

(56) References Cited

U.S. PATENT DOCUMENTS

| | | | | |
|---|---|---|---|---|
| 3,749,441 A | * | 7/1973 | Bini | 297/223 |
| 3,841,658 A | * | 10/1974 | Singh | 297/474 |
| 4,431,233 A | * | 2/1984 | Ernst | 297/468 |
| 4,687,254 A | * | 8/1987 | Baumert et al. | 297/481 |

(Continued)

FOREIGN PATENT DOCUMENTS

| | | |
|---|---|---|
| JP | 02-90000 U | 7/1990 |
| JP | 03-64100 U | 6/1991 |

(Continued)

*Primary Examiner* — David E Allred
(74) *Attorney, Agent, or Firm* — Dickinson Wright PLLC

(57) ABSTRACT

A trim covering for a seat assembly of a vehicle, the trim cover having an inner and outer surface and a bonding tape applied to at least one of the inner or outer surfaces. The bonding tape is used to bond portions of the trim cover together, provide additional structural integrated to the trim cover and provide improved craftsmanship in closing-out certain areas of the trim cover. A method of performing a trim cover assembly for use in a seat assembly of a vehicle. The method includes applying heat and pressure over a predetermined time period to bonding tape arranged at a joint between at least two trim components, placing such bonding tape and trim components in a mold, and applying heat and pressure over a predetermined time period to such trim components having the bonding tape arranged at a joint, to form a one-piece trim assembly.

4 Claims, 17 Drawing Sheets

(56) References Cited

U.S. PATENT DOCUMENTS

| | | | |
|---|---|---|---|
| 4,978,169 A | 12/1990 | Shannon et al. | |
| 5,004,295 A | 4/1991 | Inoue | |
| 5,318,350 A * | 6/1994 | Okamoto | 297/468 |
| 6,108,842 A * | 8/2000 | Severinski et al. | 5/653 |
| 6,416,128 B1 * | 7/2002 | Fujii | 297/218.1 |
| 6,582,016 B1 | 6/2003 | Kirchoff et al. | |
| 6,722,733 B2 * | 4/2004 | Schmidt et al. | 297/229 |
| 6,971,677 B2 * | 12/2005 | Niimi | 280/801.1 |
| 7,360,842 B2 * | 4/2008 | Sayed et al. | 297/463.1 |
| 8,302,994 B2 * | 11/2012 | Ko | 280/801.1 |
| 2003/0138586 A1 | 7/2003 | Fowler | |
| 2004/0004388 A1 * | 1/2004 | Schmidt et al. | 297/482 |
| 2004/0151864 A1 | 8/2004 | Thomas | |
| 2006/0278513 A1 | 12/2006 | Kawahira et al. | |
| 2007/0040426 A1 | 2/2007 | Kenny | |
| 2007/0056957 A1 | 3/2007 | Diemer et al. | |
| 2007/0170755 A1 | 7/2007 | Hazlewood | |
| 2008/0036110 A1 | 2/2008 | Brooker et al. | |
| 2008/0150335 A1 * | 6/2008 | Pines et al. | 297/219.12 |
| 2009/0091165 A1 * | 4/2009 | Thompson | 297/228.12 |
| 2009/0284056 A1 * | 11/2009 | Chico | 297/228.1 |
| 2010/0109390 A1 * | 5/2010 | Nishimura et al. | 297/180.12 |
| 2011/0049950 A1 * | 3/2011 | Pereira | 297/219.12 |
| 2012/0037169 A1 * | 2/2012 | Carlson et al. | 128/889 |

FOREIGN PATENT DOCUMENTS

| | | | | |
|---|---|---|---|---|
| JP | 04208652 A | * | 7/1992 | B60N 3/04 |
| JP | 06135298 A | * | 5/1994 | B60R 22/26 |
| JP | 06-206229 | | 7/1994 | |
| JP | 07-11955 U | | 2/1995 | |
| JP | 07-156316 | | 6/1995 | |
| JP | 2003-291869 A | | 10/2003 | |
| JP | 2004-113597 A | | 4/2004 | |
| JP | 3138309 U | | 12/2007 | |

* cited by examiner

VEHICULAR TRIM APPLICATIONS USING FILM ADHESIVE IN LIEU OF STITCHING

CROSS REFERENCE TO RELATED APPLICATION

This U.S. National Stage patent application claims the benefit of PCT Patent Application International Serial No. PCT/US2009/038176 filed on Mar. 25, 2009, entitled "Vehicular Trim Applications Using Film Adhesive In Lieu Of Stitching," and U.S. Provisional Patent Application Ser. No. 61/039,229 filed on Mar. 25, 2008, entitled "Vehicular Trim Applications Using Film Adhesive In Lieu Of Stitching," the entire disclosures of the applications being considered part of the disclosure of this application and hereby incorporated by reference.

TECHNICAL FIELD

This invention relates generally to improved methods for trimming a vehicular seat assembly, and more specifically to various applications and uses of film adhesive in seating applications to achieve various objectives. Bonding tape (i.e., film adhesive) technology is targeted as a replacement/substitute that could work in parallel with the current sew process for trim applications. Bonding tape is a thermo-sensitive adhesive that requires heat, time and pressure to activate. Tape technology is currently used in the apparel industry to replace the cut and sew process. Ideally, bonding tape technology will yield a lighter weight trim cover (by smarter material utilization) with increased styling flexibility that does not compromise comfort. Bonding tape can be used on both the A & B surfaces of a trim surface, providing both a decorative solution as well as a structural solution.

BACKGROUND

A typical vehicular seat is comprised of a skeletal frame manufactured from steel or other structural material upon which is supported a foam or other suspension system. The foam and/or suspension system in the seat is covered with a trim piece, typically, made of a fabric, leather or other sheet type roll material to provide an attractive appearance, comfort for the occupant, as well as durability and maintenance.

The typical vehicular seat is covered with a trim material that consists of numerous patterned pieces which are specifically cut to accommodate the various contours of the seat. These pattern pieces are typically sewn together to form a 3 dimensional shell into which the frame and seat suspension components are placed. Every one of the trim pattern pieces includes a peripheral portion known as selvage. Selvage is the specially defined edge of trimmed fabric or other covering material through which sew stitching is placed to join the pieces together. Typically, 8 to 10 millimeters of selvage is added to each side of a seam for sewing. The selvage material is customarily embedded below the visible surface, and thereby forms material which adds weight, cost and unnecessary bulk to any seat assembly.

In a typical front row cloth seat of a motor vehicle, approximately 16% of the trim material is selvage. Selvage is something of a necessary evil, in that it adds cost, mass and creates craftsmanship and comfort issues. Various attempts have been proposed to eliminate or reduce the selvage. However, none of the alternatives to date have proven sufficient to adequately offset the traditional method of sewing seams that are backed by a reasonable amount of selvage.

Thermoplastic film adhesives have been developed to eliminate the need for sewing in garments designed for body wear. While film adhesives of this type have been applied in body wear type garment applications, there has been no suggestion or motivation to extend use of the product outside of the garment industry due to the highly specialized nature of various fabric joining operations.

SUMMARY OF THE INVENTION

The present invention is directed to a trim covering for a seat assembly of a vehicle, the trim cover having an inner and outer surface and a bonding tape applied to at least one of the inner or outer surfaces. The bonding tape is used to bond portions of the trim cover together, provide additional structural integrated to the trim cover and provide improved craftsmanship in closing-out certain areas of the trim cover.

A method of performing a trim cover assembly for use in a seat assembly of a vehicle. The method includes laying a first component over a portion of a second component to define a joint. Placing bonding tape at such joint, and applying heat and pressure over a predetermined time period to the bonding tape arranged at the joint. Arranging the first and second components with the bonding tape at the joint in a mold, and applying heat and pressure over a predetermined time period to such first and second trim components. Removing the first and second components from the mold to form a one-piece trim assembly.

Another aspect of the invention includes the bonding tape having an elastic member attached thereto providing attachment between the trim cover and the seat frame. Such attachment, depending on the size of the elastic member, can provide a predetermined contour to the trim cover.

According to a still further embodiment of this invention, a method is provided for creating a preformed trim cover with use of the bonding tape. The bonding tape is used to bond at least two different trim cover pattern pieces together prior to placing the entire assembly of pattern pieces into a male and female contoured molds, and applying heat and pressure to create the final preformed trim cover.

BRIEF DESCRIPTION OF THE DRAWINGS

These and other features and advantages of the present invention will become more readily appreciated when considered in connection with the following detailed description and appended drawings, wherein.

DETAILED DESCRIPTION

Figure 1:
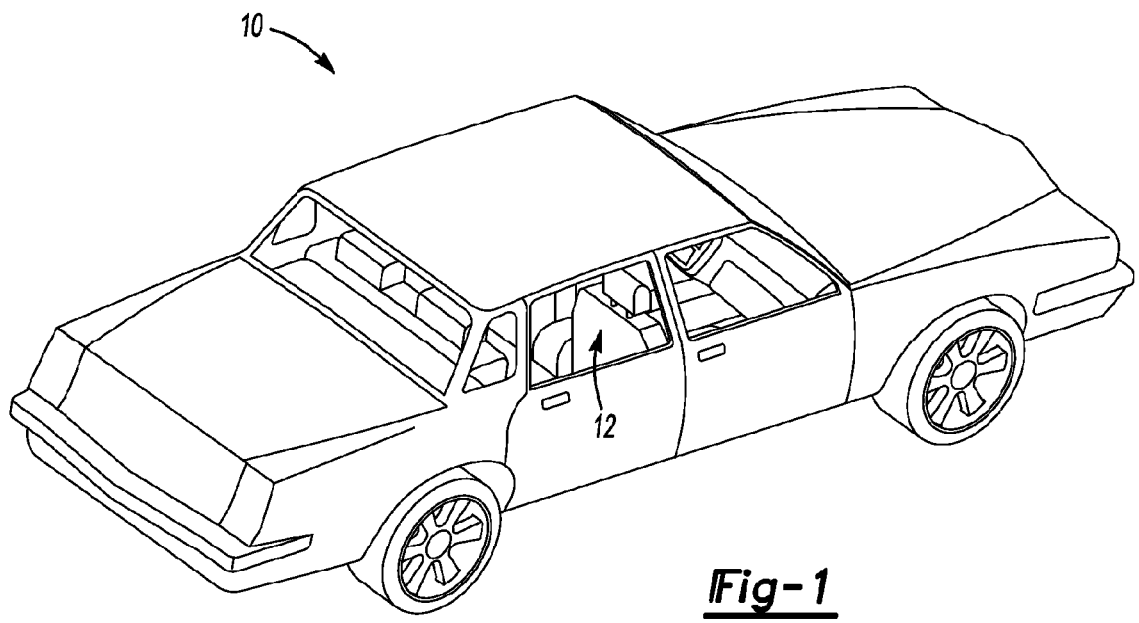
FIG. 1 is a perspective view of an exemplary motor vehicle including a seat having a trim cover according to the subject invention.

Referring to the Figures, wherein like numerals indicate like or corresponding parts throughout the several views, an exemplary motor vehicle is generally shown at 10 in FIG. 1. The vehicle 10 is shown with a seat assembly 12.

Figure 2:
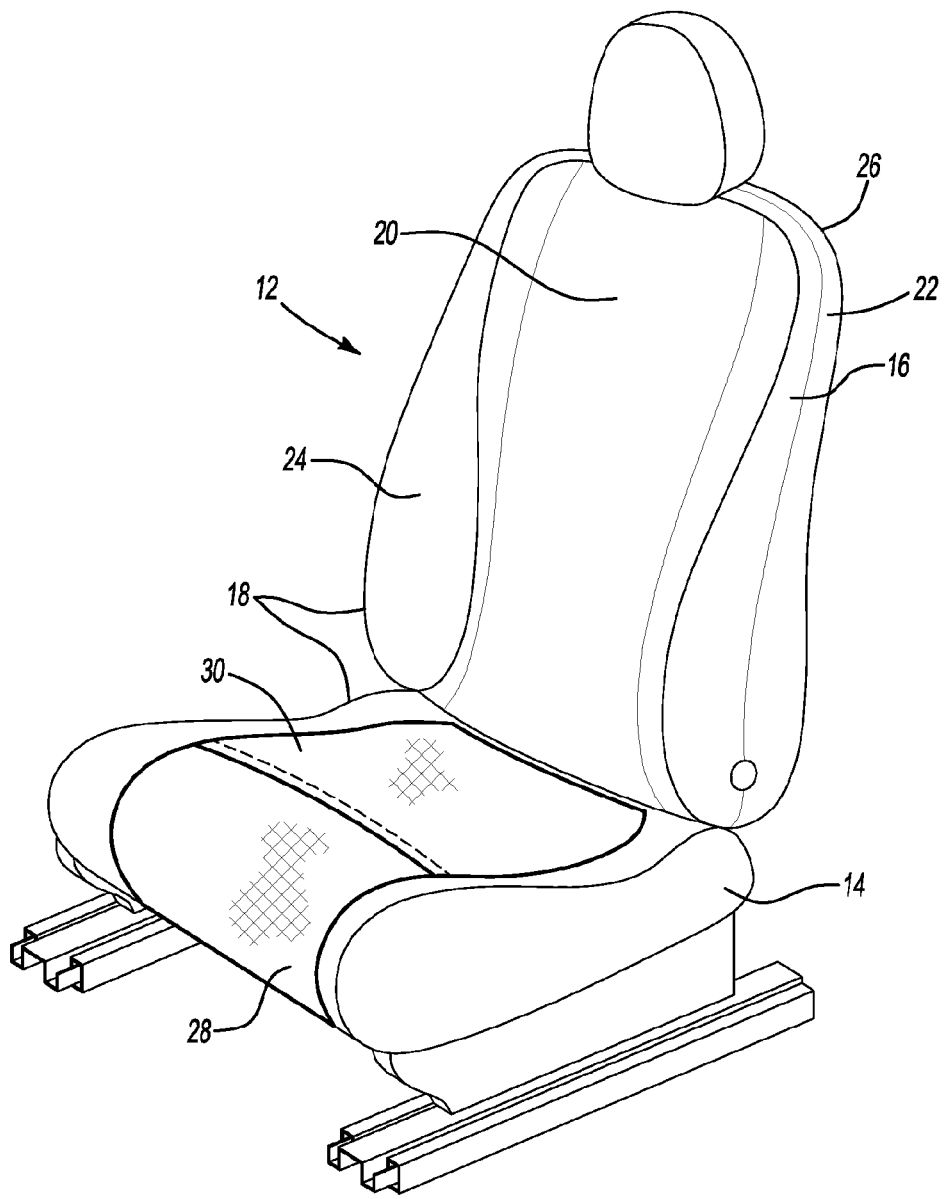
FIG. 2 is an enlarged view of a seat such as may be used in a vehicle and which includes a seat trim cover that is manufactured according to the subject invention.

The seat assembly 12 includes a seat cushion 14 and a backrest 16 as shown in FIG. 2. Both the seat cushion 14 and the backrest 16 each include a frame assembly, cushion and trim cover 18 covering the cushion and frame. Seat trim covers in general are made of a fabric such as leather, vinyl or cloth depending on the vehicle type. The trim cover 18 can consist of numerous patterned pieces which are specifically cut to accommodate the various contours of the seat 12. For example, the backrest 16 of the seat 12 shown in FIG. 2, may include four separate pattern pieces including, the front 20, two sides 22 and 24 and back 26. These pattern pieces are typically sewn together to form a 3 dimensional shell into which the frame and seat suspension components are placed.

FIG. 2 shows the seat 12 having a trim cover 18 for at least a portion of the seat cushion 14 made of two pattern pieces, 28 and 30. Usually, pattern pieces 28 and 30 are stitched together. However, instead of stitching pieces 28 and 30 together, the present invention uses bonding tape 31 to attach pieces 28 and 30 together. The resultant structure comprising pieces 28 and 30 providing a simple, cost effective, and perhaps less bulky structure as compared to conventional stitching. Further, the bonding tape will yield a lighter weight trim cover with increased styling flexibility that does not compromise comfort.

The bonding tape may be in a roll form with varying lengths and widths or in a die cut pattern trimmed to match a predetermined pattern. The bonding tape may be of the type commercially sold by Bemis Associates UK or Bemis Manufacturing Company located in Shirley, Mass. under the designation of SewFree. The bonding tape includes an adhesive which is activity with heat and pressure to complete a bond between two pieces to be joined.

Figure 3:
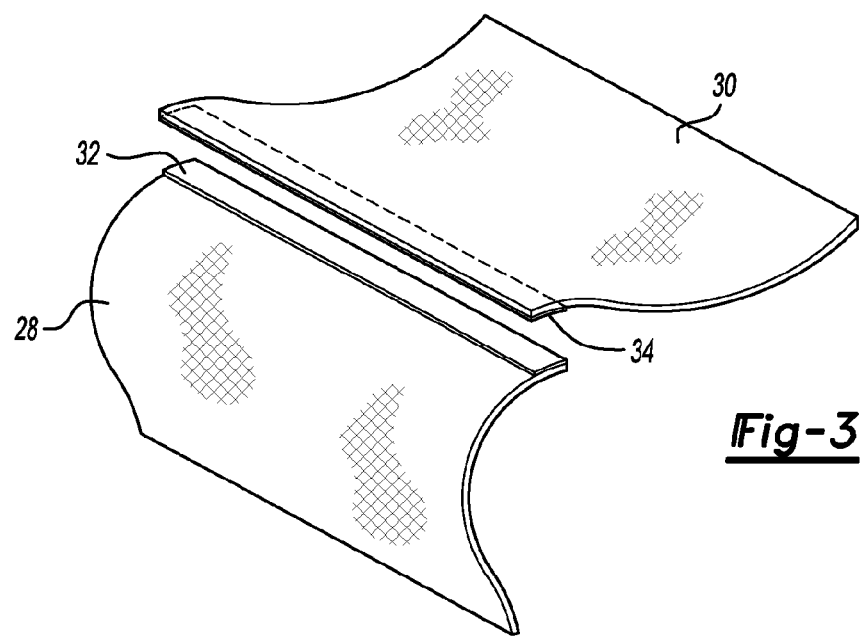
FIG. 3 is a perspective view of two trim pieces used in the seat shown in FIG. 2 prior to assembly with use of a bonding tape.

The pattern pieces 28 and 30 of FIG. 2 are shown in an unassembled state in FIG. 3. Each pattern piece includes an inner and outer surface. Pattern piece 28 includes an edge 32 formed along the outer surface of piece 28 for mating engagement with an edge 34 formed along the inner surface of pattern piece 30. In this embodiment, the outer surface of piece 30 is formed for mating with an inner surface of piece 28. However, it should be appreciated that, if needed for strength and durability purposes, the edges 32, 34 may be folded over at least in part to obtain an increased material thickness formed along such edges.

Figure 4:
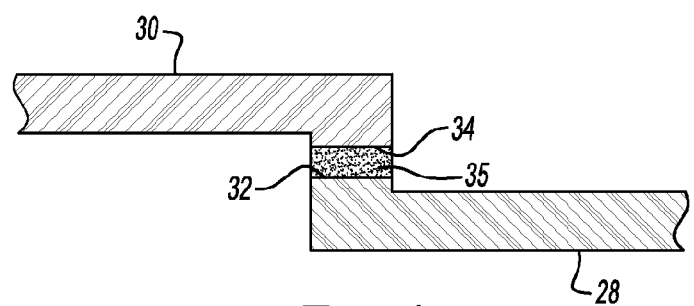
FIG. 4 is a partial side sectional view of the two trim pieces from FIG. 3 showing the bonding tape positioned with respect thereto.

In FIG. 4, the pattern pieces 28 and 30 are shown in overlapping fashion at edge 32 and edge 34 along with the bonding tape 35 positioned between both. In this FIG. 4, the edges 32 and 34 are not shown as folded over but instead are shown in an unfolded position. To form a final trim cover section between pattern pieces 28 and 30, the bonding tape is positioned between edges 32 and 34, and heat and pressure are applied for a predetermined time period to cause the bonding to occur between edges 32 and 34.

Figure 5:
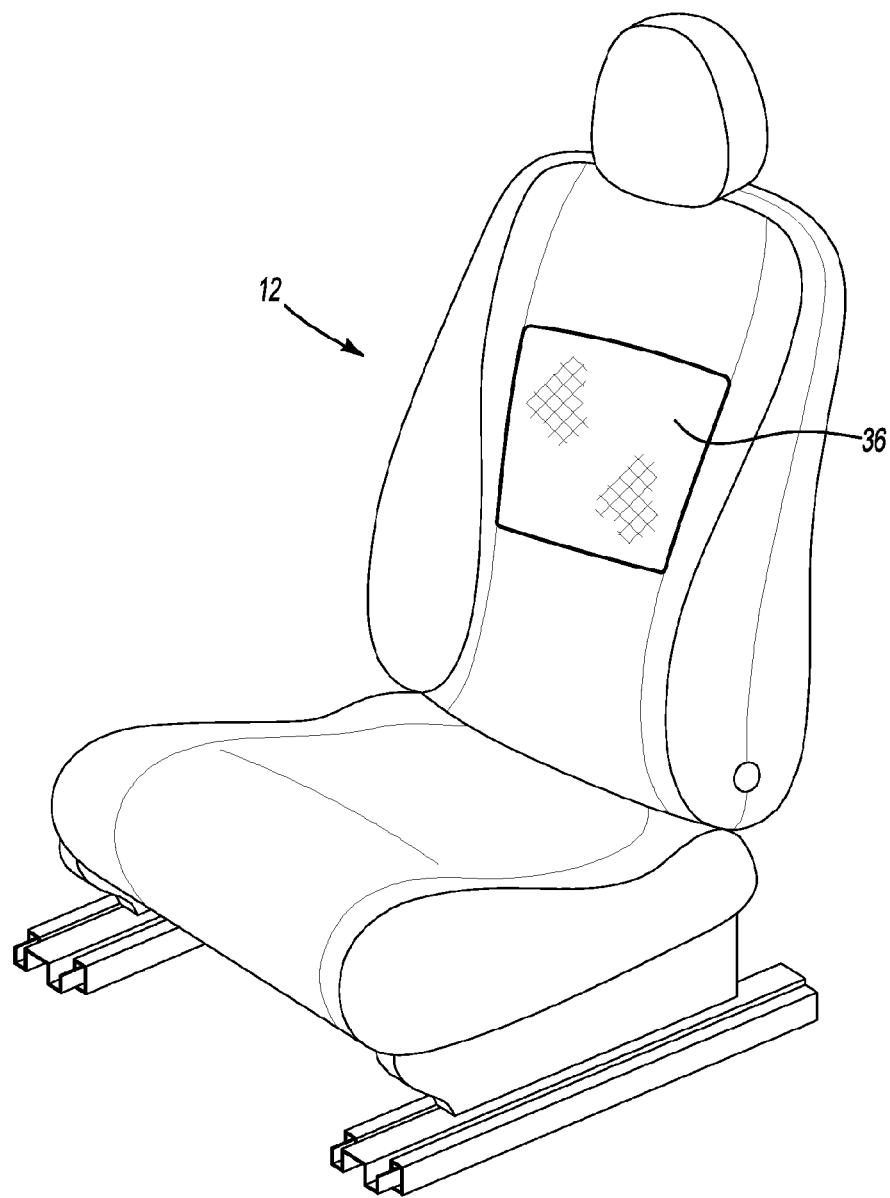
FIG. 5 is an enlarged view of a seat having an additional trim panel added to the existing trim cover with use of the bonding tape.

FIG. 5 shows a similar use of bonding tape with a trim pattern piece 36. In this embodiment, the bonding tape is used to repair tears or defects in an existing seat trim cover. Trim piece 36 can be cut from the same material as the original trim cover material and attached to the existing trim cover with the use of the bonding tape to conceal defects.

Figure 6:
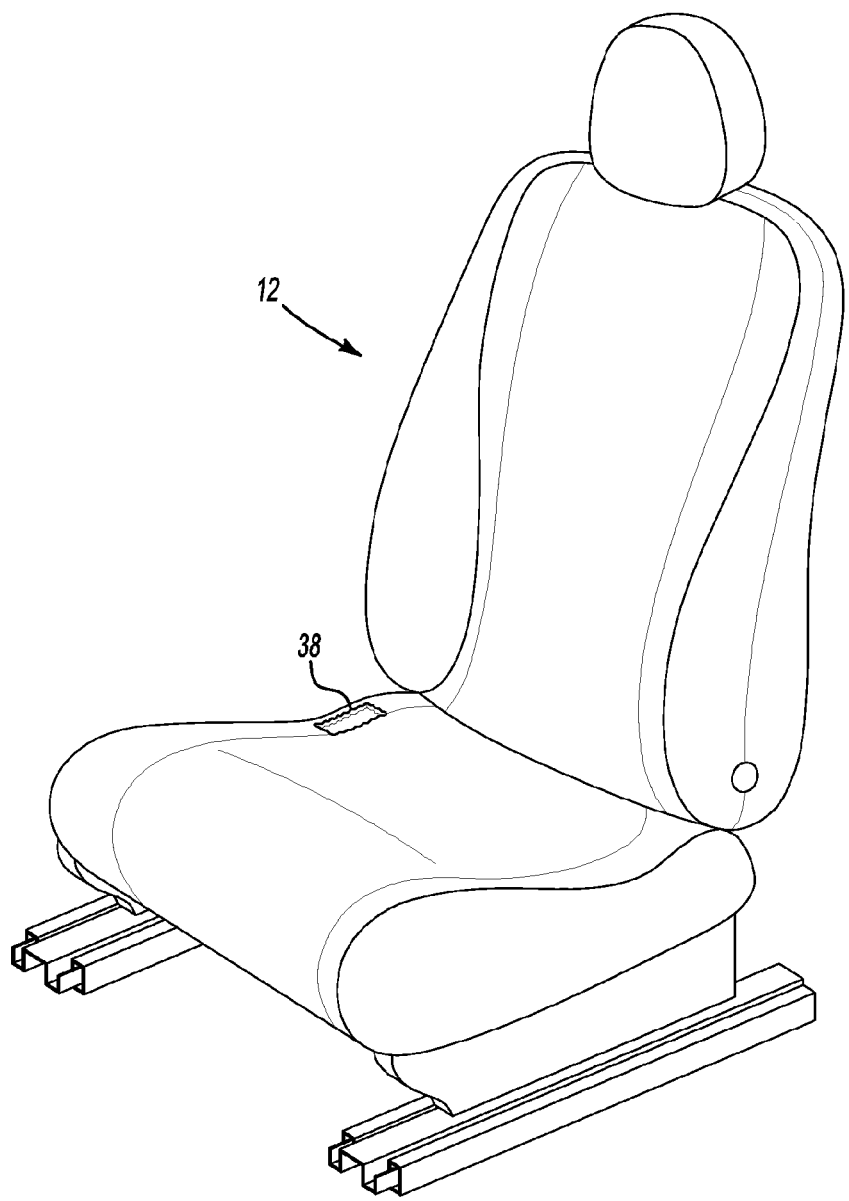
FIG. 6 is an enlarged view of a seat showing a trim cover with an opening in the trim cover having a seat buckle extending therethrough.

FIG. 6 shows another embodiment of the present invention where the trim cover of the seat includes an opening 38 for permitting another component of the seat assembly to extend therethrough. Such components may include a headrest post, seat belt attachment point, buckle, or isofix rod. FIG. 6 shows the seat trim cover having an opening 38 permitting a seat belt attachment point to extend from the seat frame through the opening 38 in the trim cover.

In practice, the opening 38 is typically formed by cutting the trim cover and most usually, the opening is larger than needed and without being trimmed-out, or closed-out, can look uncompleted. In the example shown in FIGS. 6 and 7, the opening 30 is cut larger than needed since the seat belt attachment point includes a larger end portion 40 extending from a smaller region 42 more closely resembling the thickness of the seat belt itself.

Figure 7:
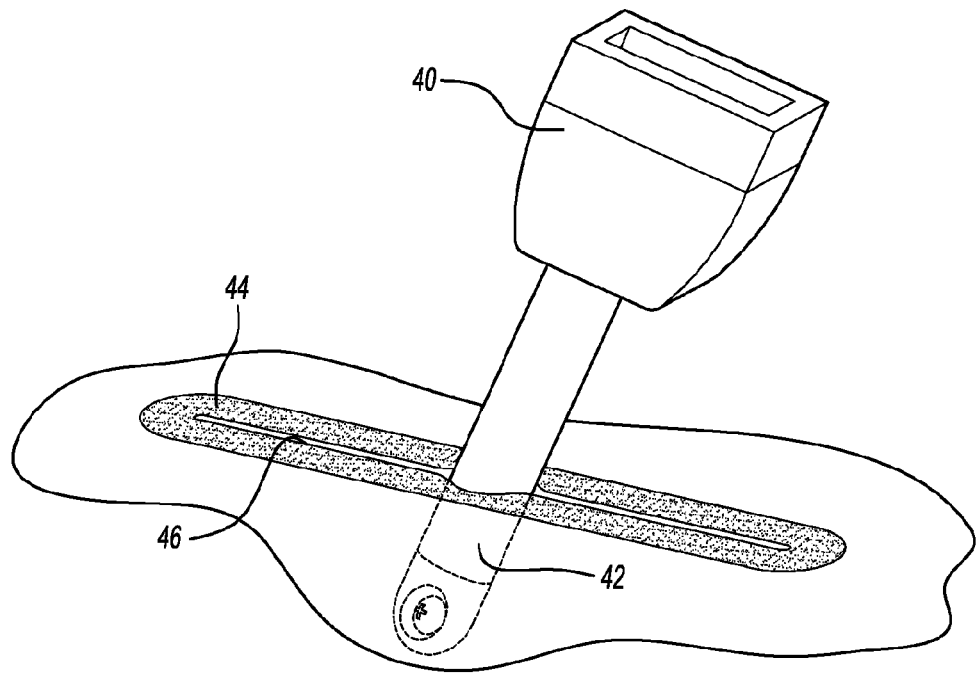
FIG. 7 is an expanded view of the seat buckle and trim cover opening of FIG. 6.

In this embodiment, the bonding tape 44 may be formed to include an opening 46 sized to more closely match the size of the smaller region 42, as seen in FIG. 7. However, since the bonding tape 44 is flexible, the larger end portion 40 can be inserted through the bonding tape 44 and since the tape is flexible, after such insertion, the bonding tape 44 returns to its original opening sized to fit the smaller region 42. The use of the bonding tape 44 for closing-out trim pieces permits improved craftsmanship in the trim cover around such components extending through the trim cover.

Figure 8:
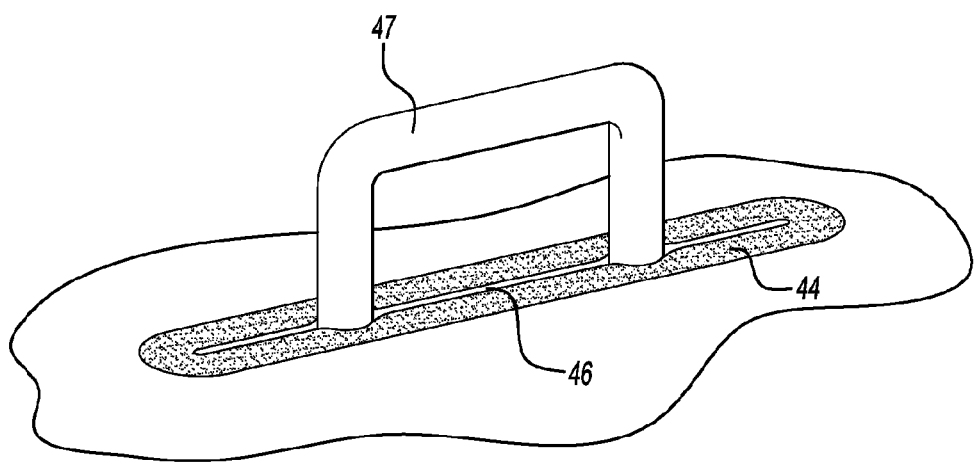
FIG. 8 is an expanded view of an isofix rod extending through an opening in a trim cover and enclosed with bonding tape.

Similarly, as shown in FIG. 8, the bonding tape 44 can be formed to include an opening 46 permitting an isofix rod 47 to extend from the seat frame through the trim cover.

Figure 9:
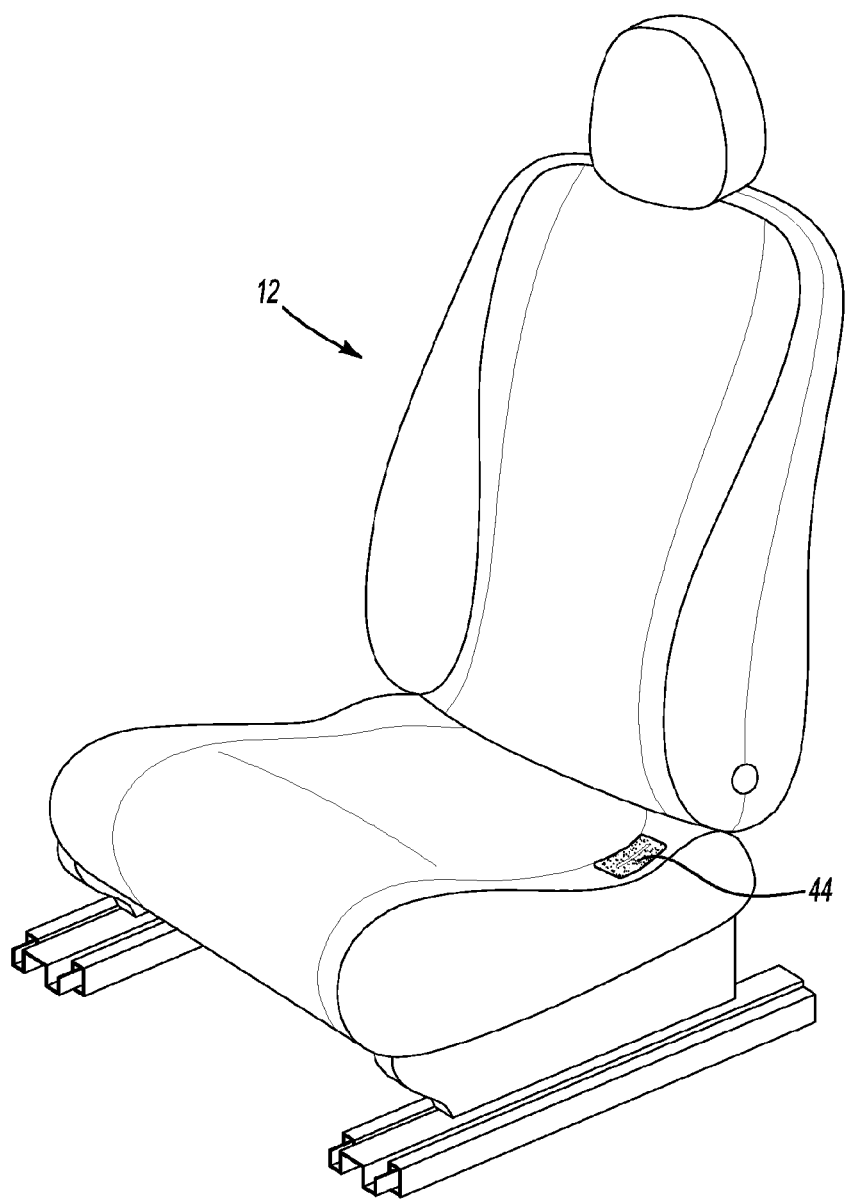
FIG. 9 is an enlarged view of a seat showing a trim cover with an opening in the trim cover having a different type of seat buckle enclosed and trimmed-out with bonding tape.
Figure 10:
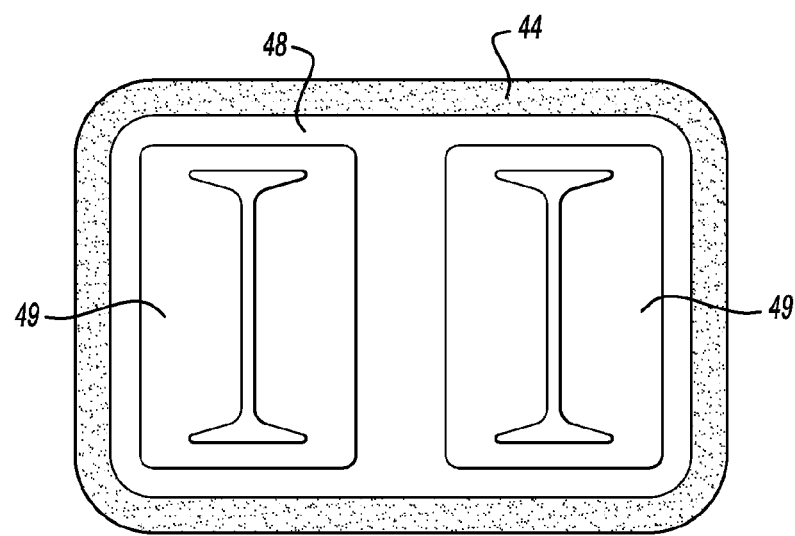
FIG. 10 is an enlarged top view of the seat buckle from FIG. 9.

FIGS. 9 and 10 shows the bonding tape 44 formed to include an opening 48 permitting a pair of seat belt attachment points 49 to extend from the seat frame through the trim cover. In this embodiment, the seat belt attachment point 49 is designed to look flush with the surface of the trim cover.

Figure 11:
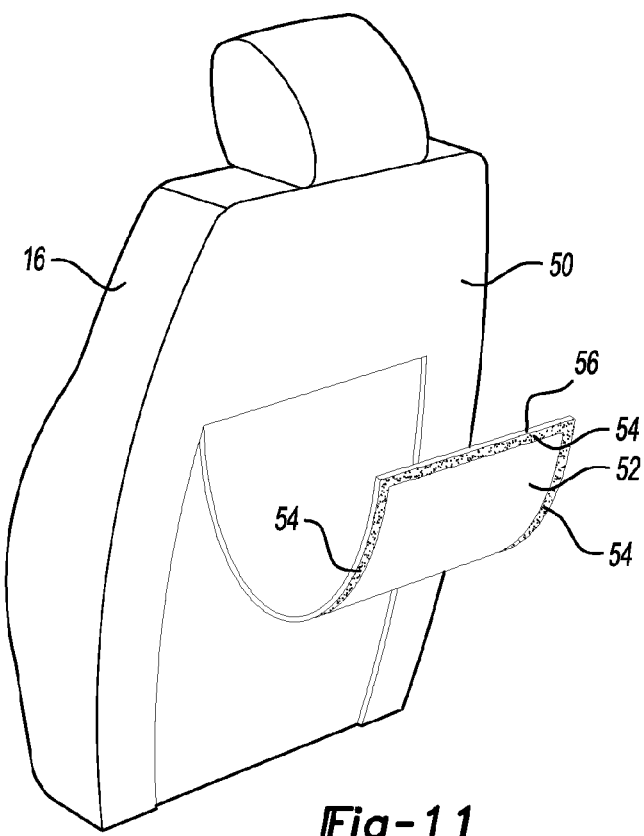
FIG. 11 is an enlarged view of a rear portion of a seat showing a flap portion in an unassembled position to the trim cover.

In another embodiment of the present invention, a trim cover 50 is shown in FIG. 11 partially covering a backrest. When the trim cover 50 is assembled to the backrest, a final operation permits a flap 52 of the trim cover to be finally attached to the trim cover 50. The flap 52 is usually either sewn or zipped closed for such final operation. However, the bonding tape 54 can be applied to the edges 56 of the flap 52 to permit the use of the bonding tape 54 to complete such final operation instead of sewing or zipping.

Figure 12:
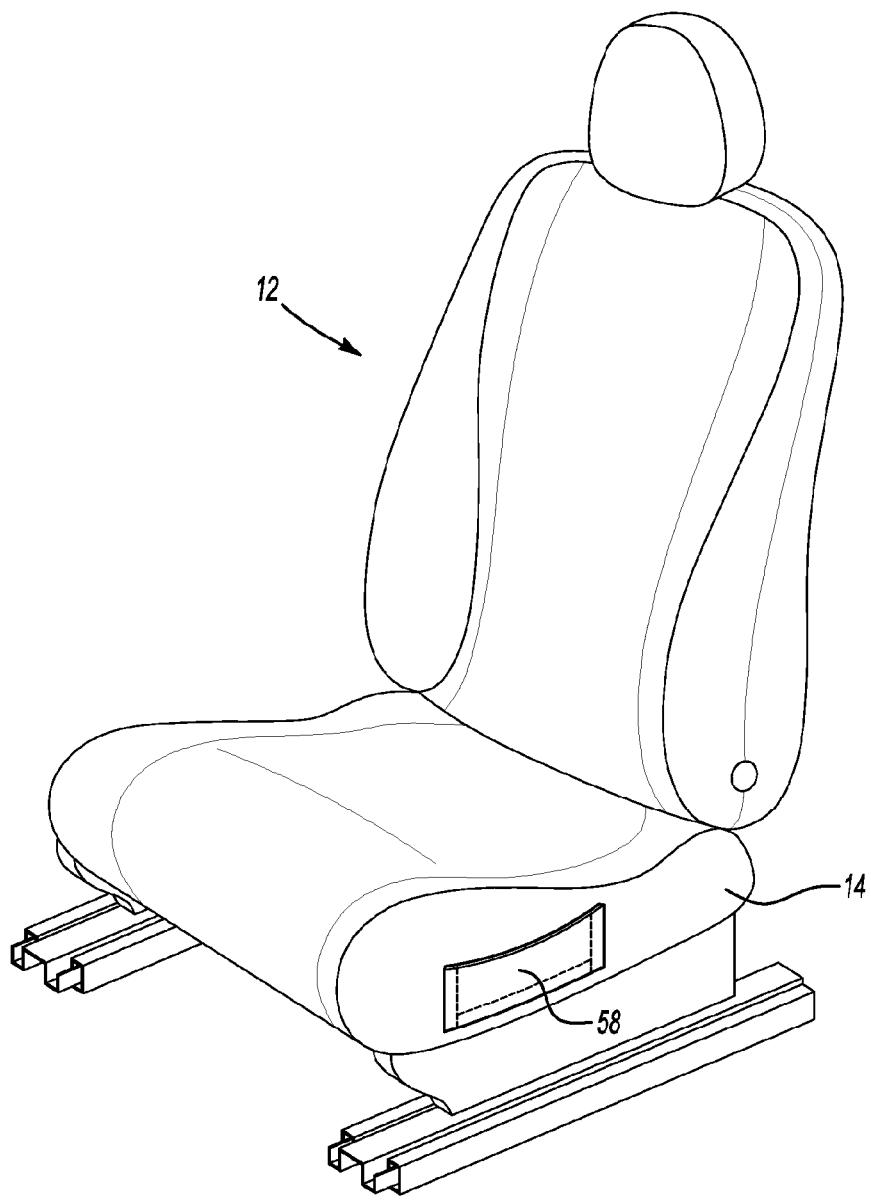
FIG. 12 is an enlarged perspective view of a seat showing a pocket attached to the seat with bonding tape.

FIG. 12 shows a vehicle seat cushion 14 having a pocket 58 positioned on at least one side thereof. The pocket 58 in this embodiment is attached to the seat cushion side with the use of bonding tape. Alternatively, the pocket 58 itself may be formed entirely from die cutting the bonding tape to a predetermined shape and seamlessly adhering the pocket 58 to the side of the seat cushion.

Figure 13:
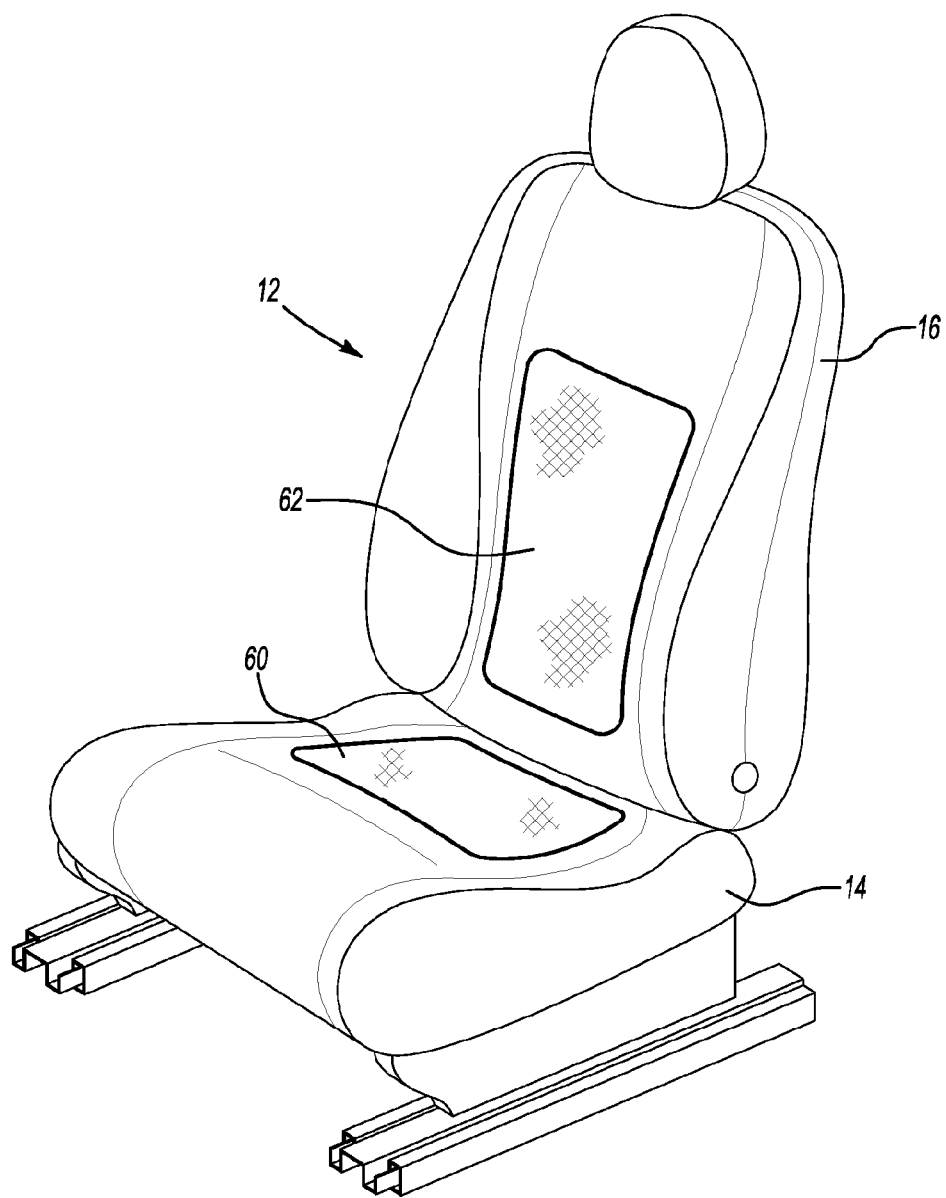
FIG. 13 is an enlarged perspective view of a seat showing two panels of the seat which are heated zones from a heating device attached to the inner surface of the trim cover with bonding tape.
Figure 14:
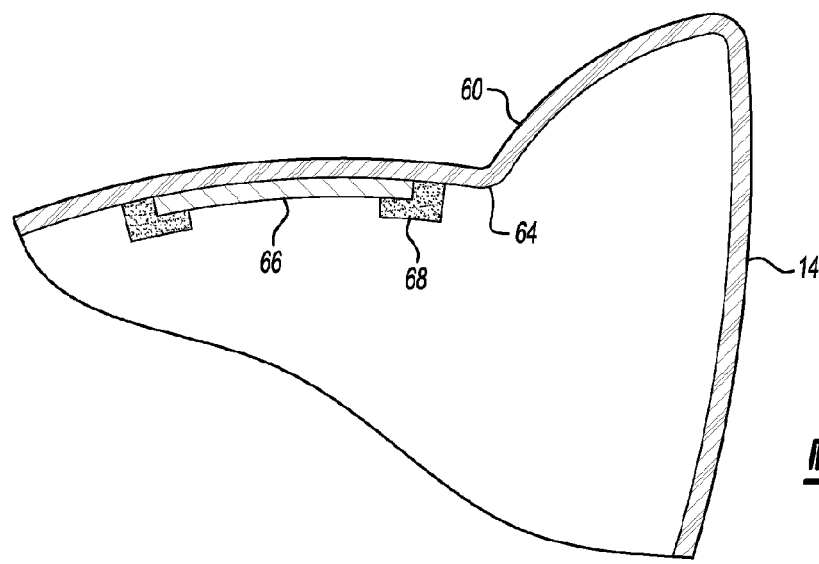
FIG. 14 is a partial front sectional view of the inner surface of one of the two panels shown in FIG. 13 having the heating element attached to the inner surface with bonding tape.

FIG. 13 shows the vehicle seat 12 having the seat cushion 14 and backrest 16 with heated trim pattern pieces 60 and 62. The trim piece 60, as shown in FIG. 14, include an inner surface 64 to which is attached a heating element 66 with bonding tape 68. This embodiment of the present invention permits the easy application of heating elements to many different portions of the trim cover without undue expense, complexity or time.

Figure 16:
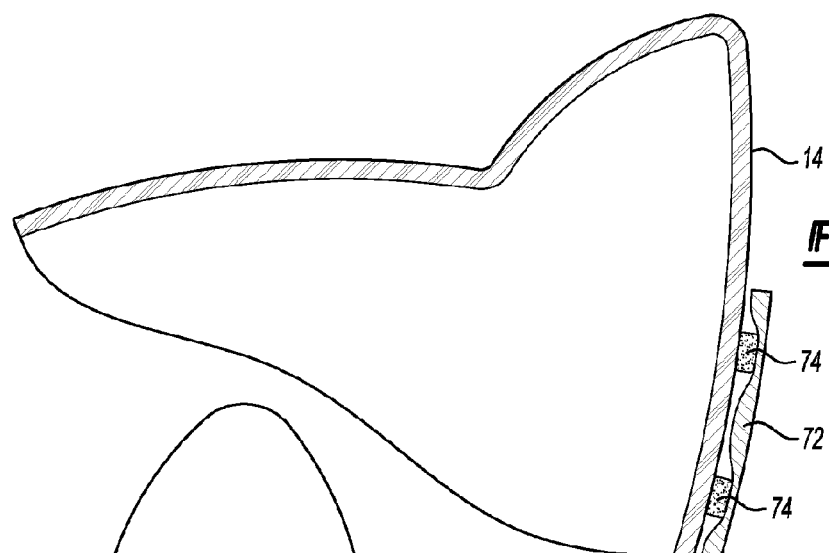
FIG. 16 is a partial front sectional view of the control panel from FIG. 15 attached to the trim cover with bonding tape.
Figure 15:
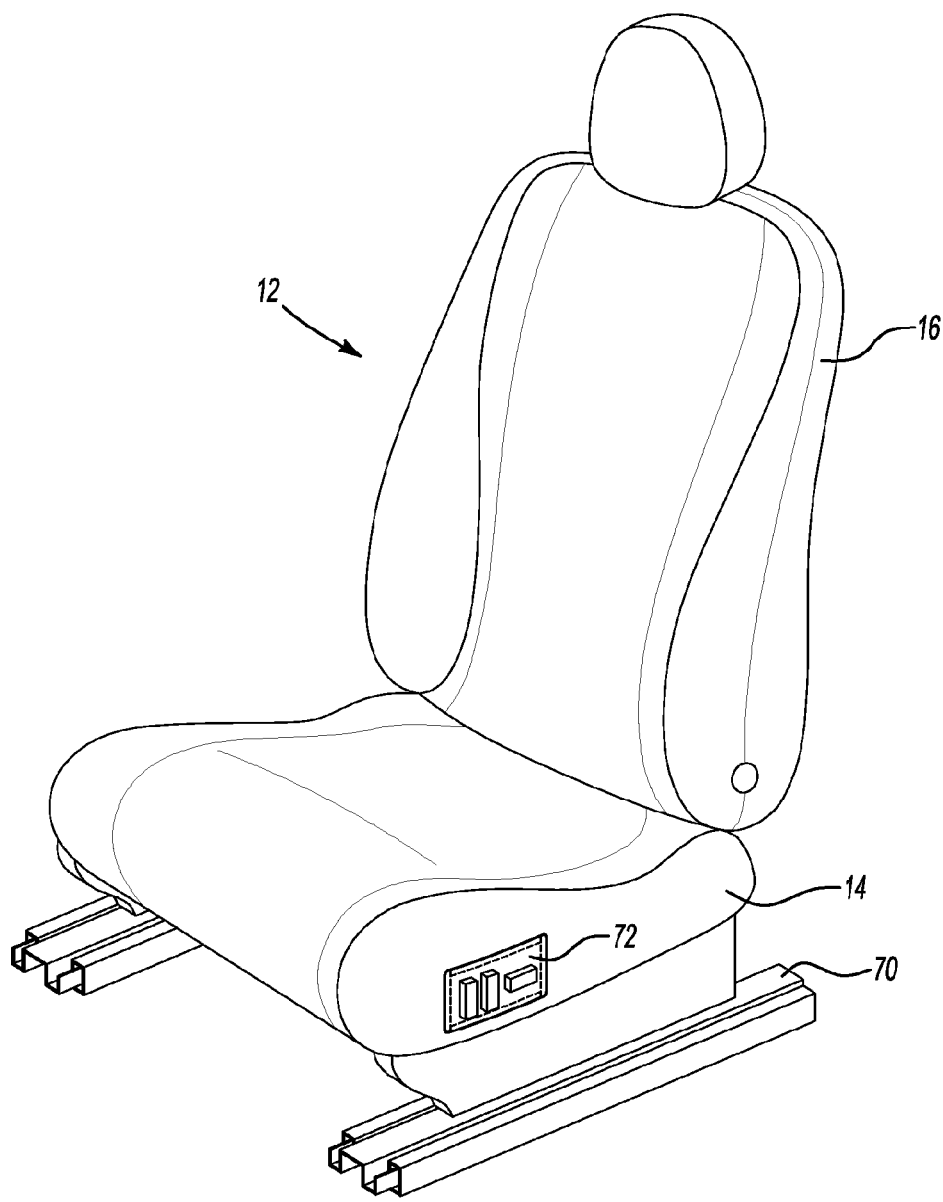
FIG. 15 is an enlarged perspective view of a seat showing a control panel for use in actuating the seat attached to the seat with bonding tape.

FIG. 15 shows the vehicle seat 12 having the seat cushion 14 and backrest 16 adjustable with respect to one another and to a frame rail 70. Such adjustment is known to include seat controls 72 attached to the seat frame or trim cover along one side of the seat cushion. In this embodiment, as also shown in FIG. 16, the bonding tape 74 can be applied to an outer surface of the trim cover and an inner surface of the seat control 72 to attach the seat controls 72 to the seat cushion 14.

Figure 17:
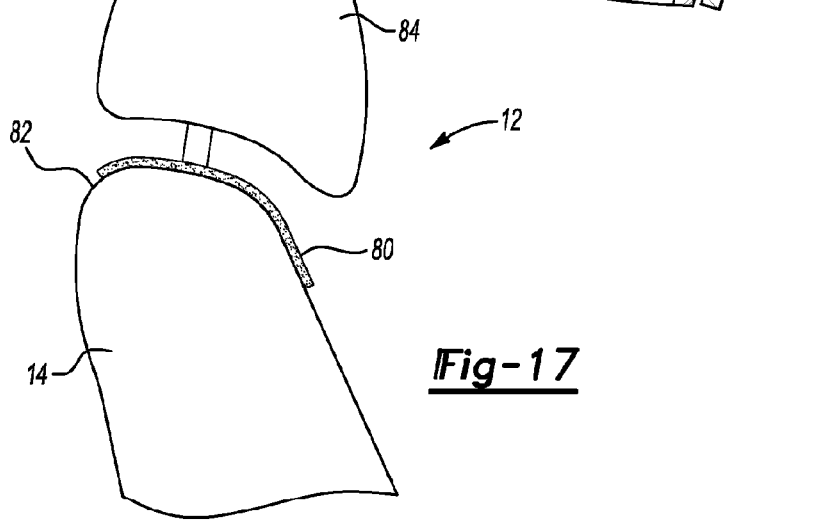
FIG. 17 is a partial side view of a seat showing a seat back and headrest extending therefrom with an additional trim cover section made of bonding tape added to the trim seat back trim cover in the region of interaction between the seat back and headrest.

The present invention can also be used on the seat 12 in areas of the seat trim cover experiencing higher wear resulting from some interaction with another component or occupant. FIG. 17 shows bonding tape 80 applied to an upper rounded portion 82 of the seat cushion 14 adjacent to the location of a headrest 84. The interaction between the headrest and the backrest 16, in practice, can cause some objectionable buzz, squeak and/or rattling noises. However, in this embodiment, the bonding tape 80 can be preformed to a certain shape by die cutting, and bonded to the upper rounded portion 82 to reduce such noise.

Figure 18:
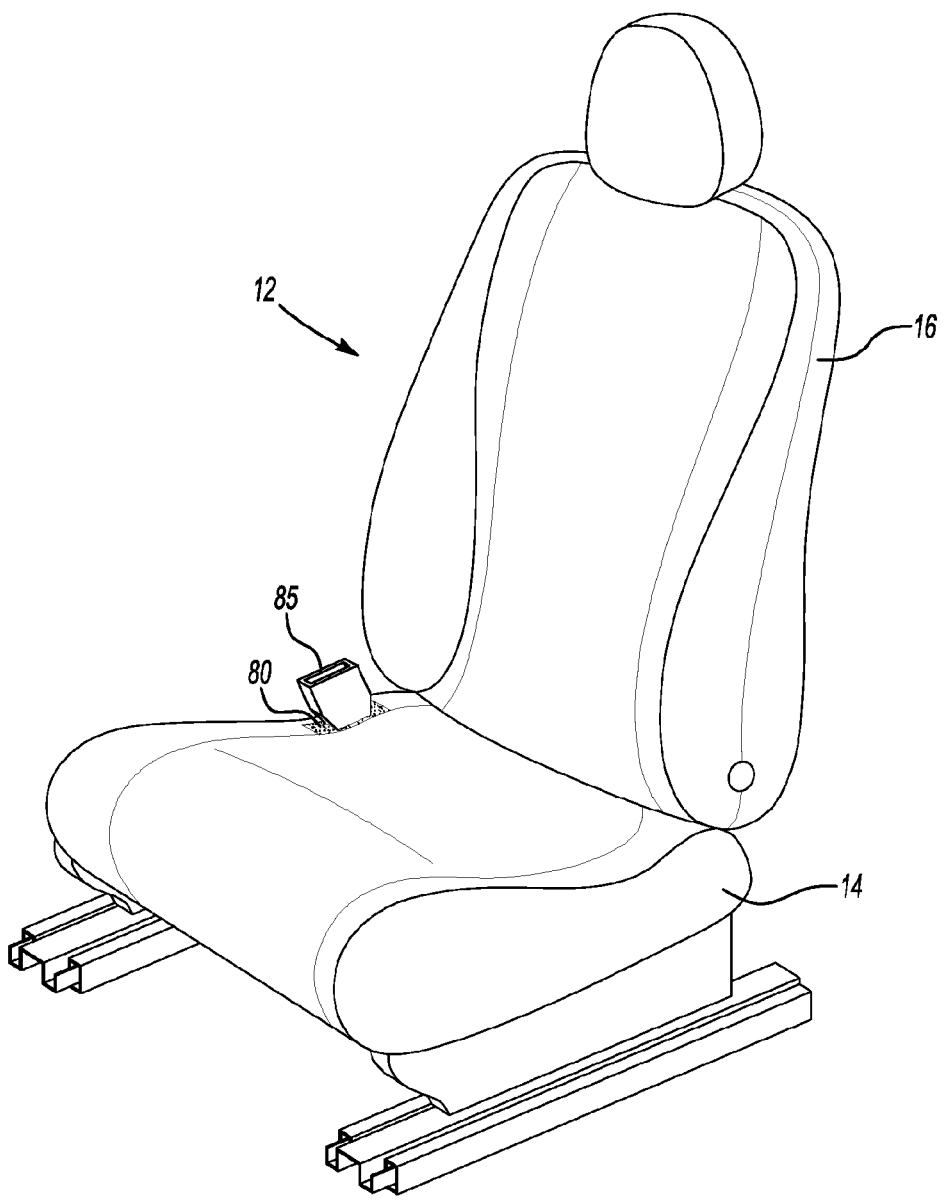
FIG. 18 is an enlarged perspective view of a seat showing an additional trim cover section made of bonding tape added to a predetermined portion of the seat having increased wear.
Figure 19:
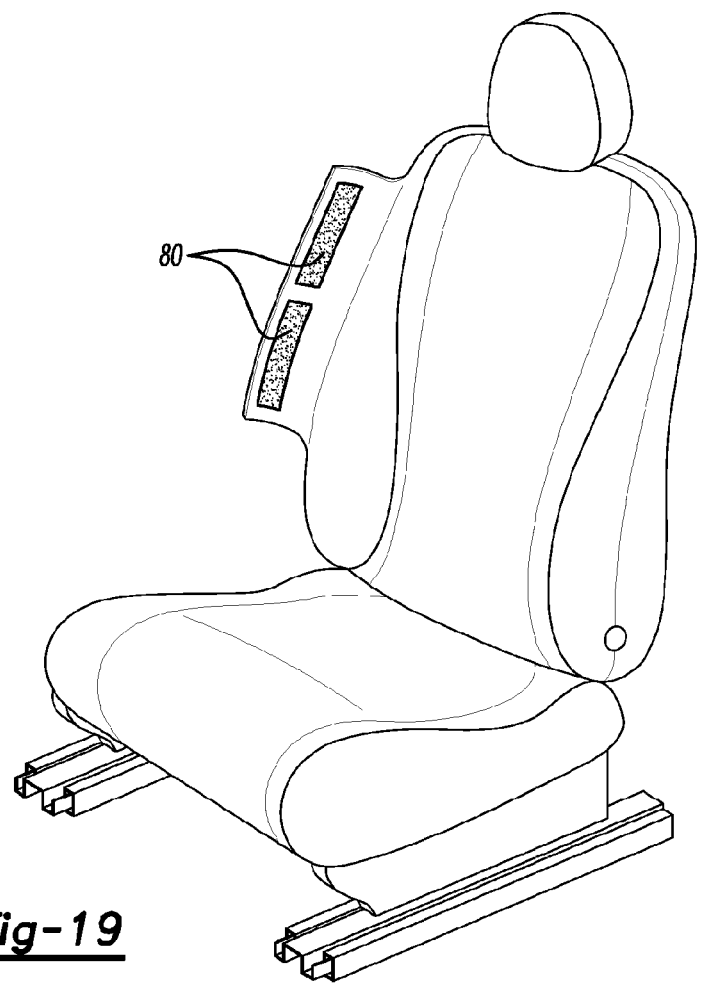
FIG. 19 is an enlarged perspective view of a seat showing a trim cover not finally assembled to the seat frame with an additional trim section made of bonding tape.
Figure 20:
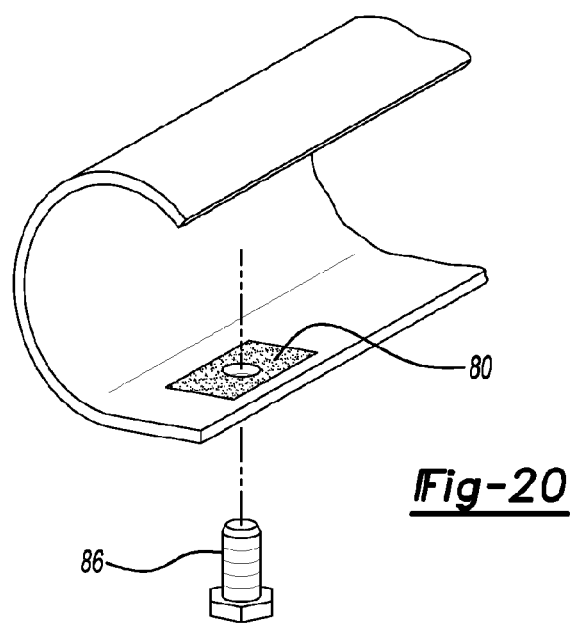
FIG. 20 is an isometric view of the trim cover, having the additional trim section from FIG. 19, being assembled to the frame with a fastener.

Another example of a higher wear or high noise area includes the region around a seat belt, or seat belt attachment point as shown in FIG. 18. In this embodiment, the bonding tape 80 can be preformed to a certain shape and made to an increased thickness for surrounding the seat belt attachment point 85 while providing increased strength to the high wear regions of the trim cover. Similarly, as shown in FIG. 19, the bonding tape 80 added to certain predetermined areas of the trim cover provides increased overall trim cover thickness to permit increase life/durability at points of attachment using fasteners 86. FIG. 20 shows the trim cover including the bonding tape 80 attached thereto in an area where a fastener is used to fix the trim cover to the seat frame.

Figure 21:
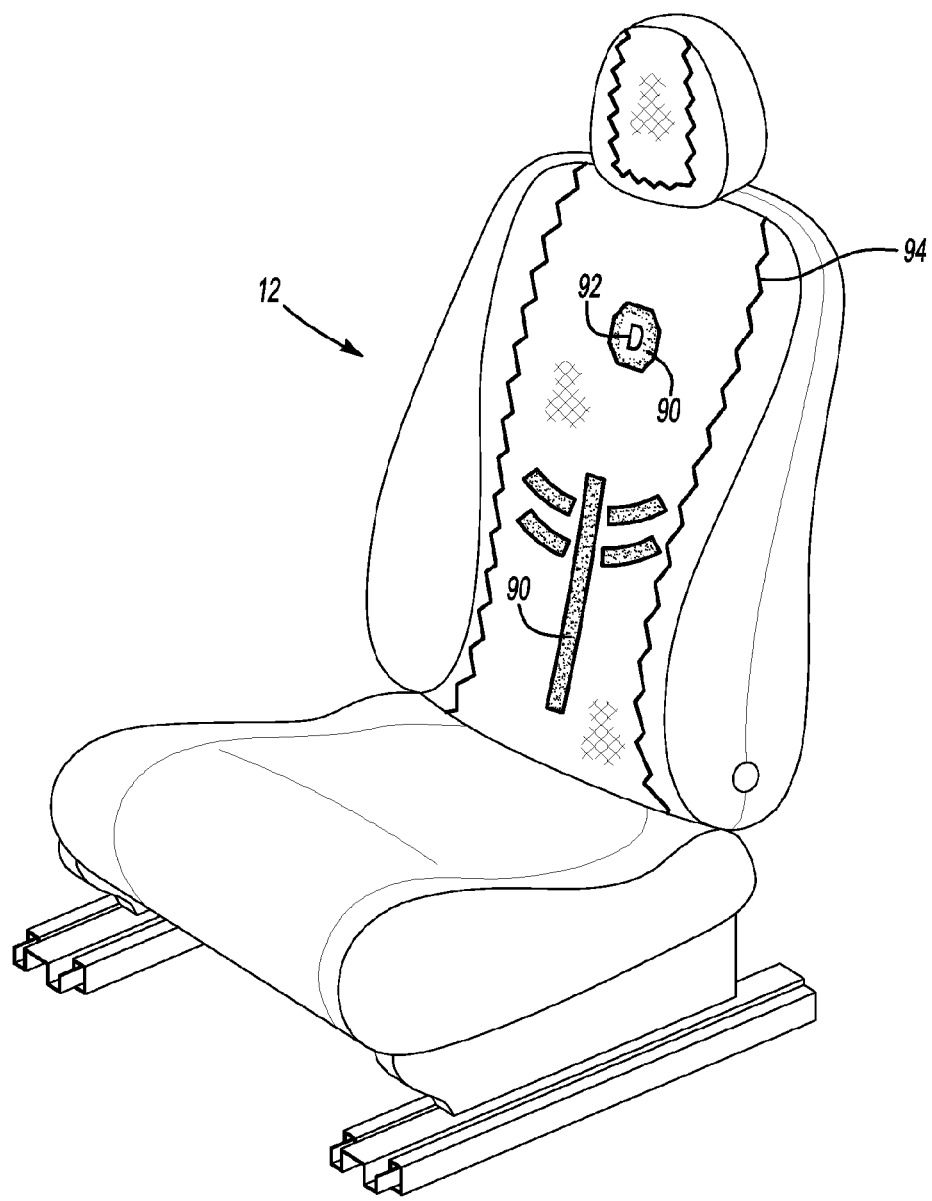
FIG. 21 is an enlarged perspective view of a seat having decorative elements made out of the bonding tape applied thereto.

FIG. 21 shows another embodiment of the present invention to create a decorative element on the trim cover. The bonding tape 90 is formed into a predetermined shape or pattern such as a letter 92 or a stitch pattern 94. The bonding tape 90 is bonded to the outer surface of the trim cover to provide a low cost decorative element on the trim cover.

Figure 22:
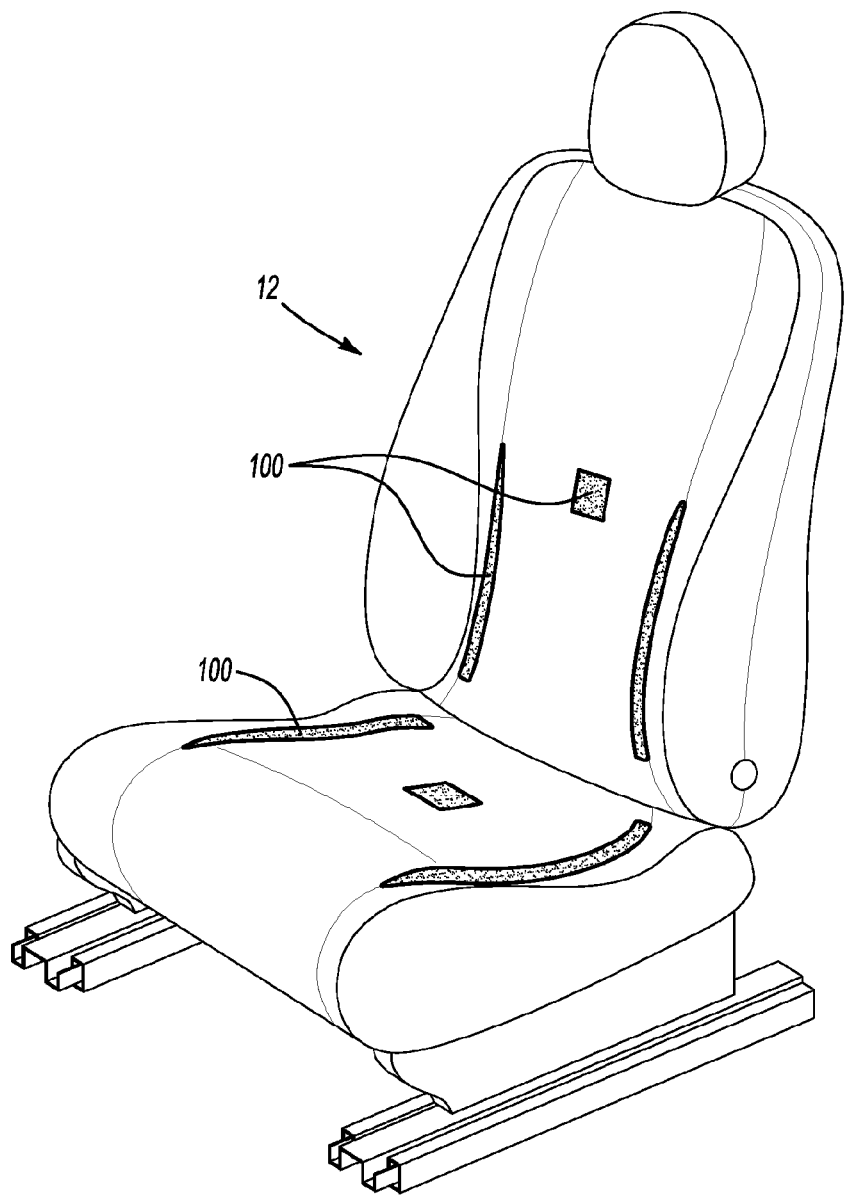
FIG. 22 is an enlarged perspective view of a seat showing predetermined depressions in the seat formed from the inner side of the trim cover with use of the bonding tape.
Figure 23:
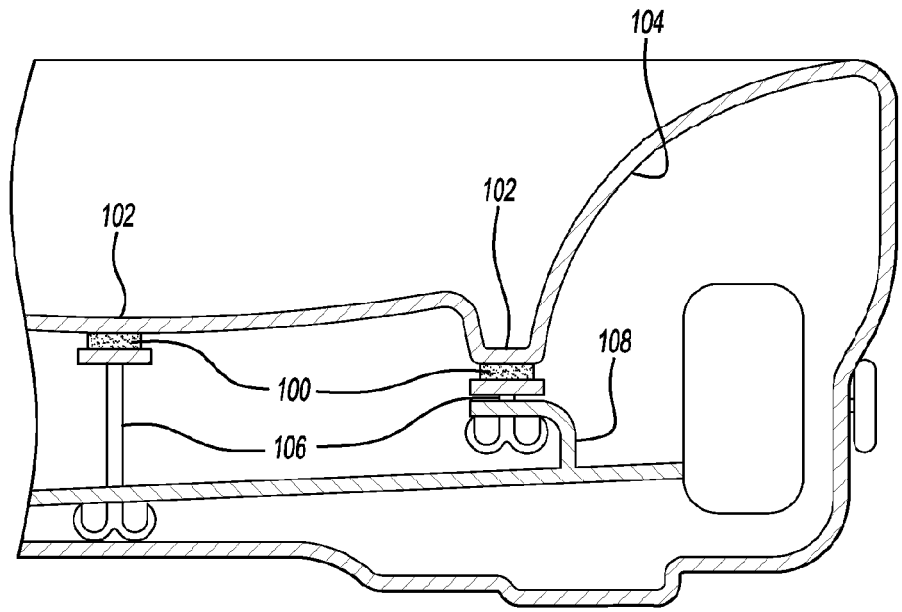
FIG. 23 is a partial front view of the seat cushion of FIG. 22 showing the use of the bonding tape with hooks for attaching to the seat frame to form predetermined depressions.

FIG. 22 shows another embodiment of the present invention using the bonding tape 100 to create desired contours 102 in the seat cushion or backrest. In FIG. 22, the bonding tape 100 is shown in phantom attached to the inner surface of the trim cover. Any number of contours can be created with this embodiment providing comfort and safety to occupant while fastening the trim cover to the seat frame. FIG. 23 shows the bonding tape 100 applied to the inner surface 104 of the trim cover for the seat cushion to create the contours 102. The bonding tape 100 includes one side for mating with the inner surface 104 of the trim cover and a second side having an elastic member 106 including loops or hooks formed thereon attached to the seat frame. The elastic member 106 can be made with varying lengths depending on the shape of the desired contour 102. In assembly, in the bonding tape 100 having the elastic member 106 formed thereon is bonded to the inner surface 104 of the trim cover, the trim cover is placed over the seat frame and cushion and the elastic member is extended toward a portion of the seat frame 108 to attach the trim cover thereto. Since the elastic member 106 is provided with lengths which may be less than the height of the cushion, various contours 102 can be achieved on the outer surface of the trim cover.

Figure 24:
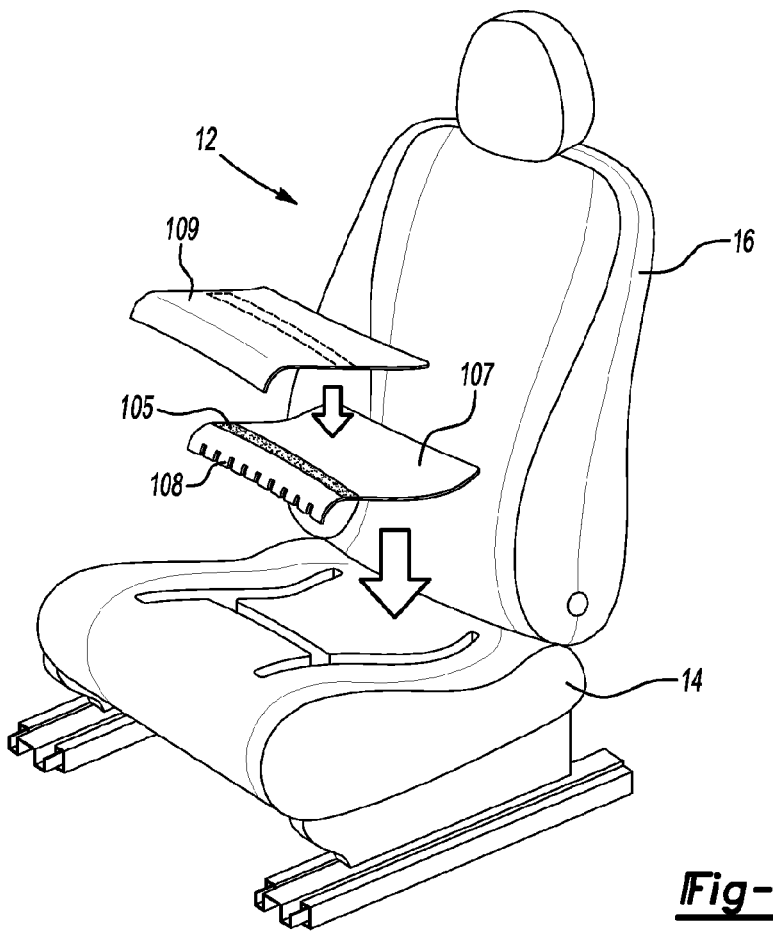
FIG. 24 is an enlarged perspective view of a seat showing the use of bonding tape to bond two or more trim panels together with one or more of the trim panels providing a tie down flap.

FIG. 24 shows the use of bonding tape 105 to bond trim panel 107 having a tie down flap 108 to another trim panel 109. In this embodiment, the trim panel 107 is provided with the flap 108 to permit attachment of the trim panel 107 to the seat frame. This embodiment provides the ease of using the bonding tape 105 for joining two panels 107, 109 while also providing flap 108 for conventional attachment to the seat frame.

Figure 25:
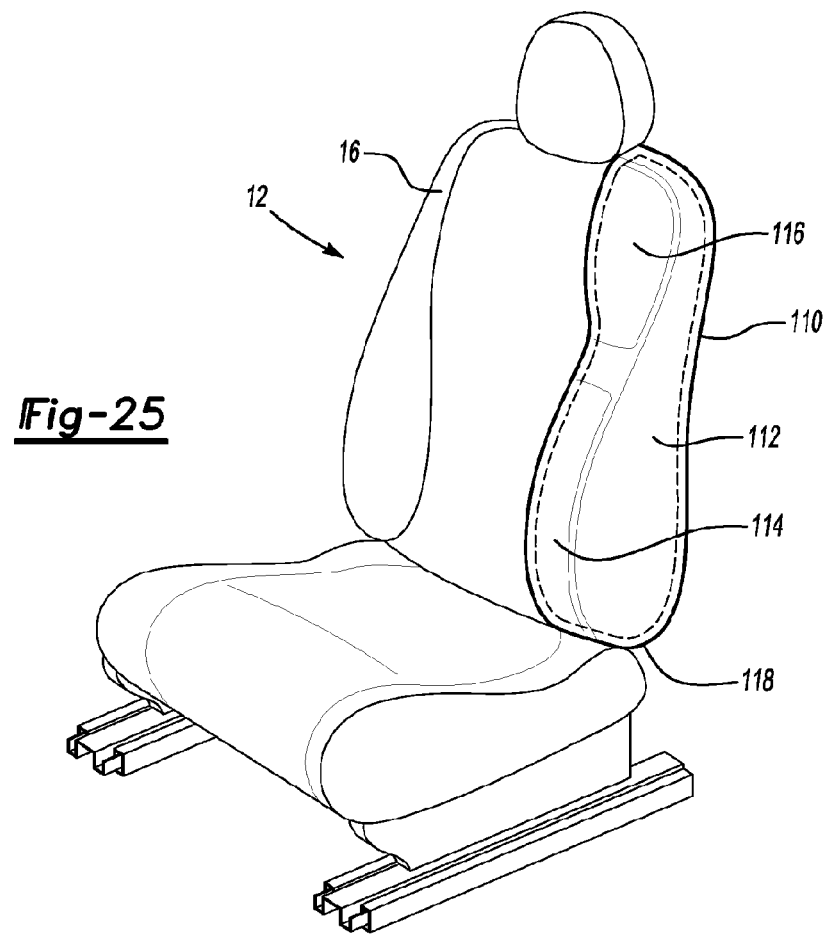
FIG. 25 is an enlarged perspective view of a seat showing at least one component of the seat formed to a certain shape from multiple trim panels with the use of the bonding tape.
Figure 26:
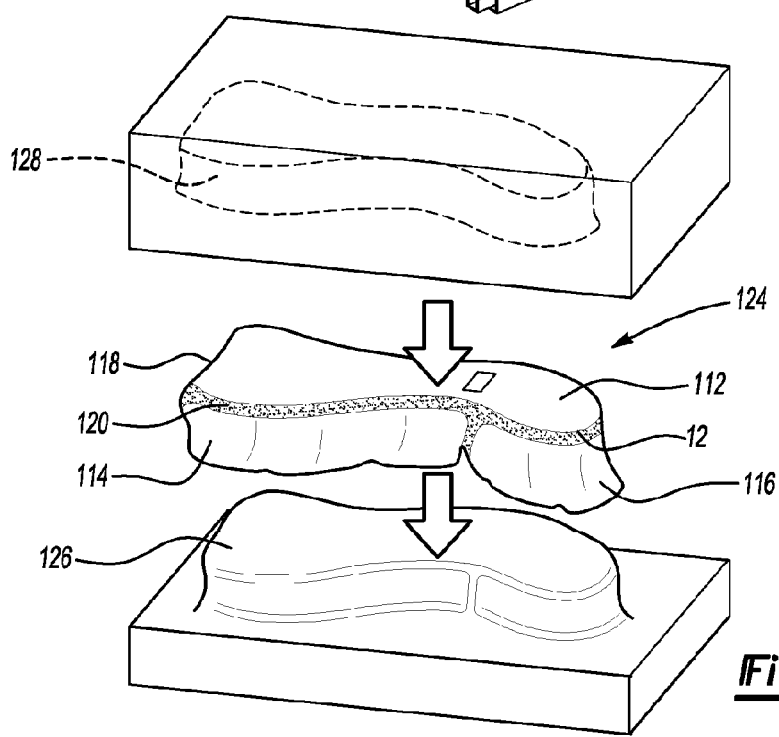
FIG. 26 is a perspective view of the component from FIG. 25 being molded into shape with the use of a male and female mold, multiple trim pieces and the bonding tape.

FIG. 25 shows a preformed trim cover 110 for the backrest 16 of the seat 12. The preformed trim cover 110 includes four pattern pieces 112, 114, 116, 118 precut to a predetermined shape. The pattern pieces 112, 114, 116 and 118 are laid flat and bonded together with bonding tape 120 with at least a portion of an edge on each of such pattern pieces overlying the other where such bonding tape 120 is applied, thereby forming a joint 122. Heat and pressure, over a predetermined time period, are applied to the joints to form a single flat pattern including all four pattern pieces, shown generally at 124 in FIG. 25. The single flat pattern 124 is laid over a male contoured mold surface 126 and positioned inside of the female mold surface 128. Heat and pressure, over a predetermined time period, are applied to the flat pattern 124. The flat pattern 124 is removed from the mold surface wherein the four pattern pieces are bonded together to form the preformed trim cover 110.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A trim cover apparatus for covering a seat assembly of a vehicle, the trim cover apparatus comprising:
    a fabric or leather trim cover having an inner and outer surface and a first opening having two dimensions in a plane of the trim cover for receiving a vehicle component;
    a bonding tape having an adhesive only on one side, the bonding tape applied to at least one of said inner and outer surfaces in a predetermined position on said trim cover around said first opening;
    said bonding tape having a second opening smaller along at least one of the two dimensions than the first opening, the second opening aligned with said first opening of said trim cover; and
    said bonding tape being of a flexible material that at least partially closes a width of said first opening of said trim cover for engaging around the vehicle component.

2. The trim cover of claim 1 wherein said first opening includes an edge.

3. The trim cover of claim 2 wherein said bonding tape is formed to cover said opening and applied to said edge of said first opening for seamlessly bonding to said edge of said first opening.

4. The trim cover of claim 3 wherein said component is a seat belt.

* * * * *